P. L. HANNUM.
BEET HARVESTER.
APPLICATION FILED SEPT. 14, 1918.
1,309,940.
Patented July 15, 1919.
3 SHEETS—SHEET 1.
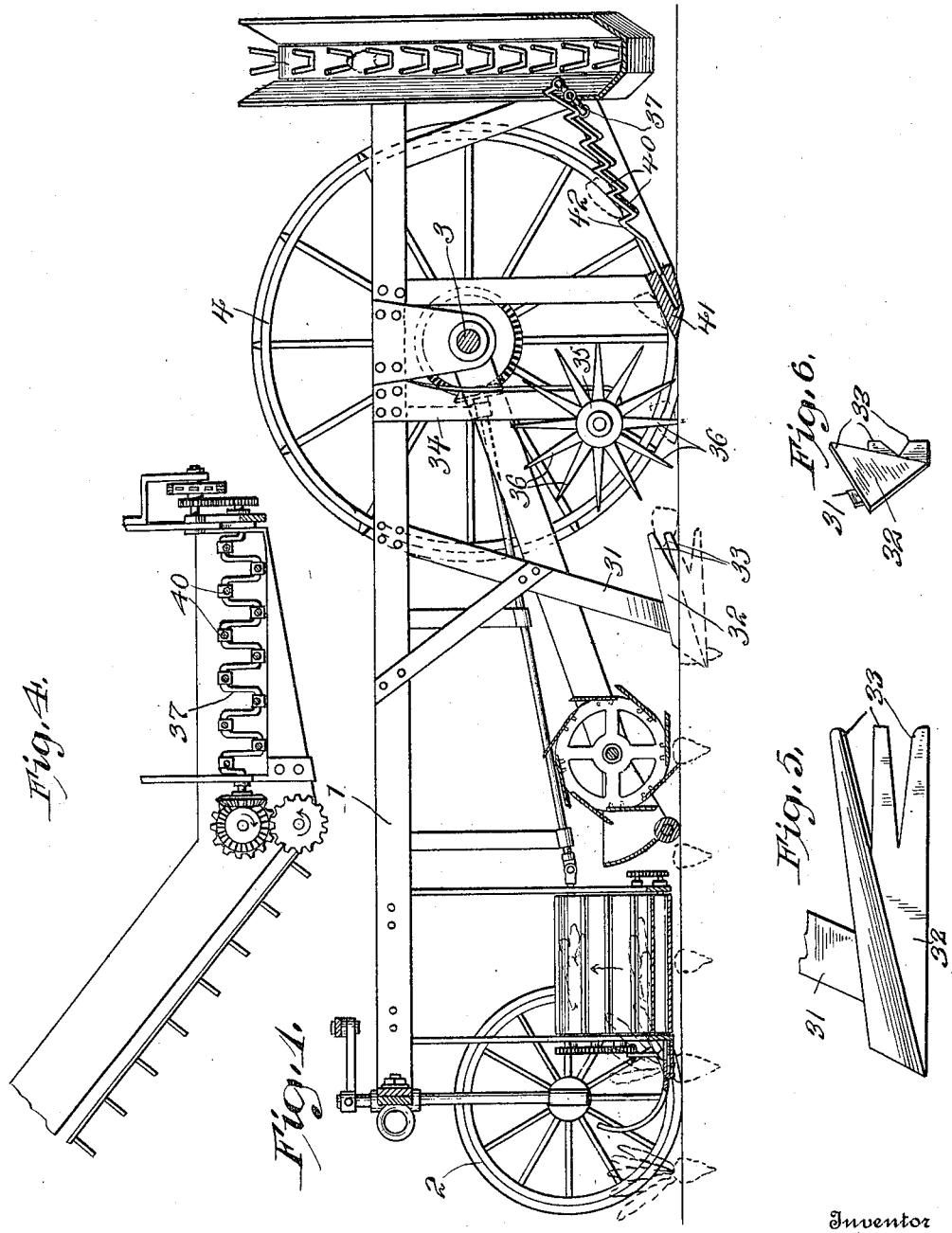

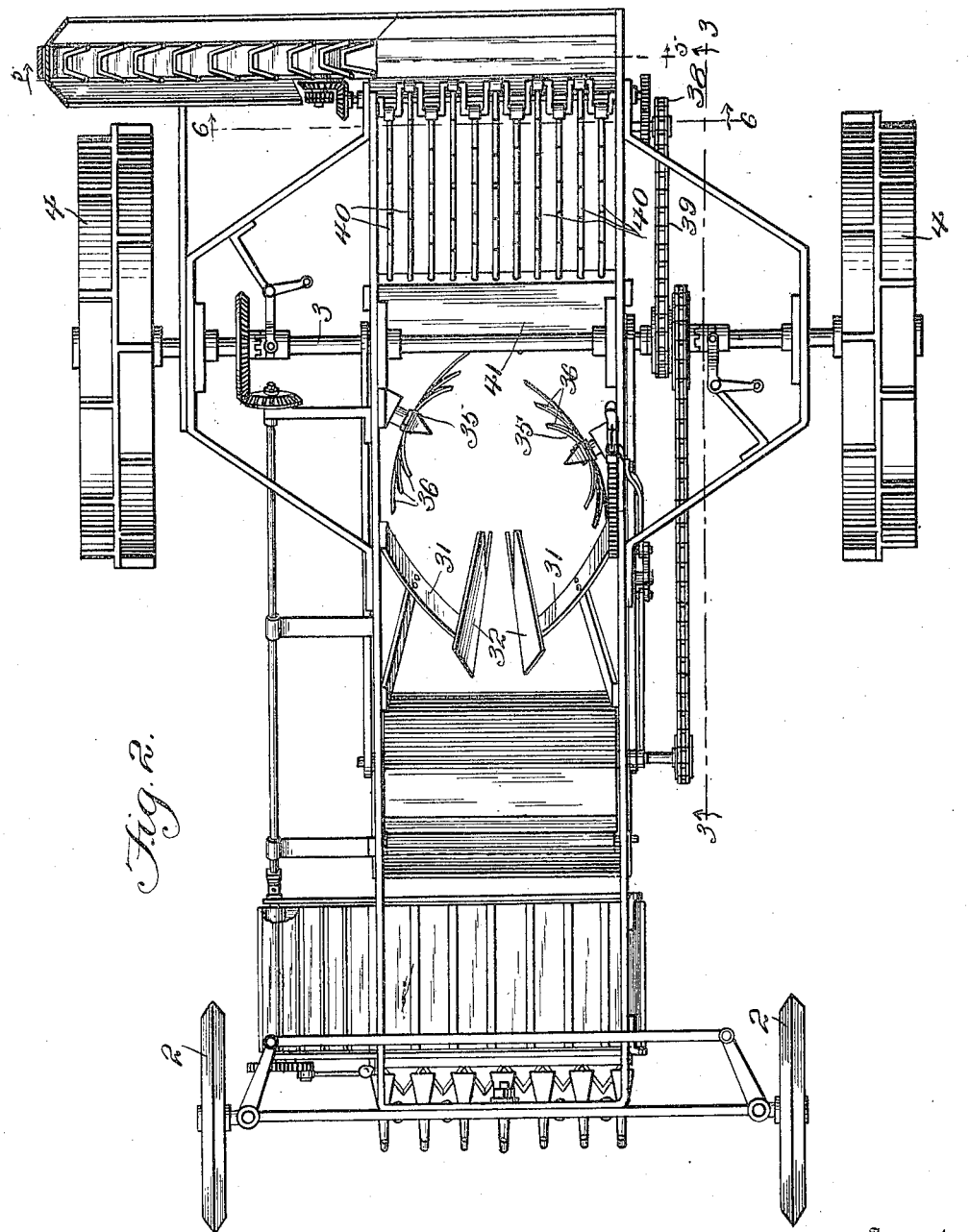

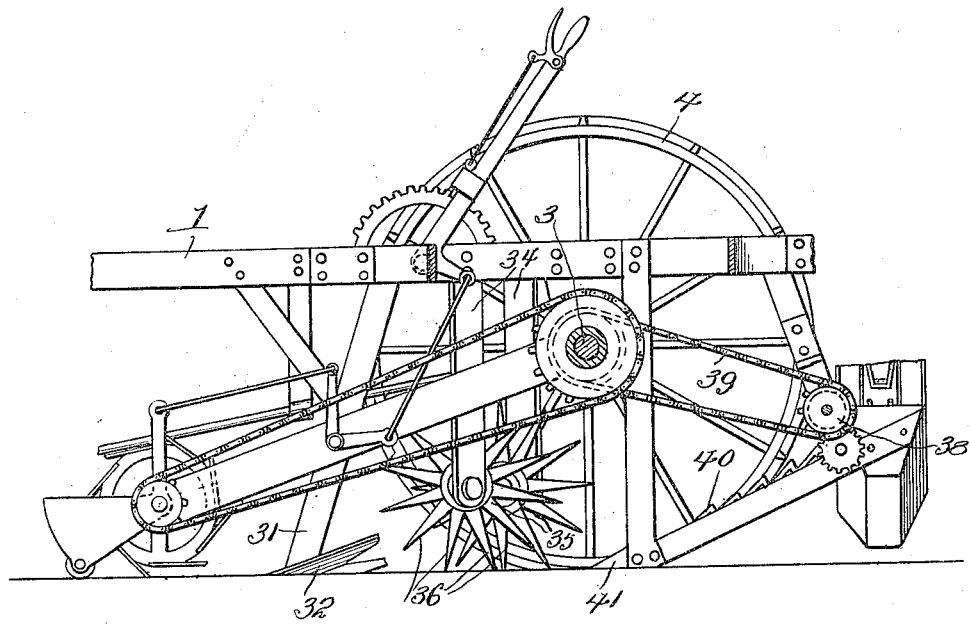

UNITED STATES PATENT OFFICE.

PHILIP L. HANNUM, OF DALHART, TEXAS.

BEET-HARVESTER.

1,309,940. Specification of Letters Patent. Patented July 15, 1919.

Application filed September 14, 1918. Serial No. 254,041.

*To all whom it may concern:*

Be it known that I, PHILIP L. HANNUM, citizen of the United States, residing at Dalhart, in the county of Dallam and State of Texas, have invented new and useful Improvements in Beet-Harvesters, of which the following is a specification.

This invention relates to beet harvesters and it consists in the novel features and combination hereinafter described and claimed.

In the accompanying drawings hereby made a part hereof:—

Figure 1 is a longitudinal vertical section of the harvester constituting the best practical embodiment of my invention that I have as yet devised.

Fig. 2 is a plan view of the same.

Fig. 3 is a longitudinal detail section taken in the plane indicted by the line 3—3 of Fig. 2.

Fig. 4 is a detail vertical transverse section taken in the plane indicated by the line 6—6 of Fig. 2.

Figs. 5 and 6 are detail views of one of the plow points.

The beet harvester comprises a frame 1 which may be composed of strips of metal secured together by any suitable means. Dirigible wheels 2 support the forward portion of the frame. An axle 3 is journaled for rotation at the rear end of the frame 1 and supporting wheels 4 are mounted upon the ends of the axle.

Standards 31 are carried by the frame 1 and plow points 32 are carried by the standards. The plow points 32 are provided at their rear edges with spaced fingers 33.

Arms 34 are carried by the frame 1 and concaved disks 35 are freely journaled for rotation at the inner lower ends of the arms 34. The said disks 35 are composed of spaced pointed fingers 36 radially disposed with relation to the centers of the disks.

The plow points 32 pass under the beets in the soil and at the opposite sides of the same and lift the beets in a usual manner. The beets are encountered by the fingers 36 of the disks 35 and elevated and shaken whereby much of the soil is removed from the bodies of the beets.

A crank shaft 37 is journaled for rotation at the rear portion of the frame 1 and has one of its ends connected through gearing, Fig. 2, with a sprocket wheel 38 which is operatively connected by means of a chain 39 with a sprocket gear on the axle 3. Rack bars 40 are pivotally connected at their rear ends with the cranks of the shaft 37 and the said bars are spaced from each other. The forward ends of the bars 40 are slidably received in a shoe 41. The bars 40 are upwardly and rearwardly inclined and the said bars are provided at their upper edges with teeth 42.

The beets which are cast rearwardly by the disks 35 are deposited upon the upper edges of the rack bars 40 and are subjected to further agitation whereby any remaining sand or dirt is shaken from them. The beets are moved upwardly and rearwardly by the teeth of the bars 40 and deposited.

Having described the invention what is claimed is:—

1. In a beet harvester, a frame having plows carried thereby for removing beets from the soil; a pair of rotatable concave disks provided with fingers, said disks being carried by said frame at the rear of said plows and having their axes disposed angularly with respect to each other, the beets being lifted between the fingers of the rotating disks; a shoe arranged at the rear of said disks; a plurality of upwardly and rearwardly inclined rack bars having their lower ends slidably mounted within said shoe, said rack bars being adapted to receive the beets from said disks; an operable crank shaft having said rack bars connected thereto at their upper ends; and means for rotating said crank shaft for reciprocating said rack bars whereby the soil is loosened and shaken from the beets.

2. In a beet harvester, a frame having traction wheels and plows carried thereby for removing the beets from the soil; a pair of rotatable disks provided with fingers, said disks being carried by said frame and disposed angularly with respect to each other to engage the unearthed beets whereby they are elevated; a shoe arranged at the rear of said disks; a plurality of upwardly and rearwardly inclined rack bars having their lower ends slidably mounted within said shoe, said rack bars being adapted to receive the beets from said disks; an operable crank shaft having said rack bars connected thereto at their upper ends; and means connecting said traction wheels with said shaft for rotating the same whereby said rack bars are reciprocated to loosen and shake the soil therefrom.

In testimony whereof I affix my signature.

PHILIP L. HANNUM.